United States Patent Office 3,344,176
Patented Sept. 26, 1967

3,344,176
METHOD OF PRODUCING BENZENE
CARBOXYLIC ACIDS
Anton Benning, Essen-Heisingen, and Kurt Handrick, Essen-Steele, Germany, assignors to Bergwerksverband G.m.b.H., Essen, Germany
No Drawing. Filed Feb. 12, 1964, Ser. No. 344,203
Claims priority, application Germany, Feb. 14, 1963, B 70,727, B 70,728
6 Claims. (Cl. 260—523)

The present invention relates to a method of producing benzene carboxylic acids and, more particularly, the present invention is concerned with producing benzene carboxylic acids from a mononuclear aromatic compound having linked to its nucleus at least one lower alkyl group, preferably a methyl group, and at least one chloromethyl group.

It is an object of the present invention to produce such benzene carboxylic acids in a simple and economical manner.

It is a further object of the present invention to produce such carboxylic acids in a relatively high yield.

Additional objects and advantages of the present invention will become apparent from a further reading of the description and of the appended claims.

With the above and other objects in view, the present invention is concerned with a method of producing benzene carboxylic acids, comprising the steps of reacting a mononuclear aromatic compound, having linked to its nucleus at least one methyl group and at least one chloromethyl group, with methanol in the presence of a substance selected from the group consisting of the hydroxides of alkali and alkaline earth metals and the oxides of alkaline earth metals so as to form the corresponding methoxymethyl-alkyl-benzene, and reacting this ether with nitric acid so as to oxidize the ether to the corresponding carboxylic acid.

It has been found, according to the present invention, that very pure benzene carboxylic acids can be obtained in an excellent yield by reacting the benzene derivatives, i.e., mononuclear aromatic compounds having linked to the nucleus at least one methyl group and at least one chloromethyl group, with methanol in the presence of alkali or alkaline earth metal hydroxide or an oxide such as calcium oxide to form a methoxymethyl-alkyl benzene. The thus formed ether is then oxidized with nitric acid to the corresponding aromatic carboxylic acid.

Suitable starting materials include the ortho, meta and para chloromethyl - toluenes, dichloromethyl - toluenes, monochloromethyl-xylenes, dichloromethyl-xylenes, monochloromethyl - pseudocumene, dichloromethyl - pseudocumene, monochloromethyl - mesitylene, dichloromethyl-mesitylene, trichloromethyl-mesitylene, monochloromethyl-durene and dichloromethyl-durene.

The reaction of such chloromethyl compounds with methanolic alkali or alkaline earth metal hydroxides (or oxides such as calcium oxide) is quick and without side reactions. The thus formed methoxymethyl compounds are thermally stable and can be easily purified without loss by crystallization or distillation. It is even possible to separate isomeric mixtures of such ethers by distillation and in this manner, upon subsequent oxidation, to obtain carboxylic acids of uniform structure.

The starting materials for the present process may be produced by chloromethylation of the corresponding mononuclear aromatic compounds, or by side-chain chlorination of methyl benzenes.

The possibility of separating the methoxymethyl alkyl benzenes by distillation gives the further advantage that unreacted portions of the alkyl benzenes, of which the starting material of the present process had been prepared by chloromethylation or side-chain chlorination, may be recovered. Similarly, by-products which were too little or too much chloro-methylated can also be separated in the form of methyl ethers and utilized per se.

The etherification of each $CH_2Cl$ group of the chloromethyl compounds requires at least one mol of alkali metal hydroxide or one-half mol of alkaline earth metal oxide or hydroxide. It is however advantageous to operate with a considerable excess of hydroxide which will prevent slowing down of the reaction towards its end. Etherification is preferably carried out at the boiling temperature of methanol. However, etherification may also be carried out in a closed vessel at higher temperatures and corresponding superatmospheric pressure, for instance between 80° C. and 150° C., preferably between 110° C. and 130° C. Carrying out the reaction at such higher temperatures will greatly accelerate the same.

Furthermore, it has been found that the water content of the methanolic reaction mixture should not rise above 20–25% by weight. Considering the amount of water which is formed during the reaction, it is therefore necessary to use at least about 5 mols of 98–99% methanol (i.e., methanol containing between about 1 and 2% water) and preferably between 8 and 15 mols of such methanol for each mol of chloromethyl group in the starting material.

The thus formed ether is then oxidized with nitric acid having a concentration of between about 10 and 66%, and between 5 and 50 parts by weight of nitric acid are used for each part by weight of the ether. Preferably, the oxidation is carried out under pressure at a temperature of between 140 and 220° C. This method of oxidizing the methoxymethyl alkyl benzenes is interesting because it was generally believed that oxidation of these ethers with nitric acid would lead to a destruction of the aromatic nucleus. In fact, the aromatic nucleus is not destroyed and this is a surprising fact in view of the exothermic nature of the reaction.

It is also possible to carry out the oxidation in a continuous manner by introducing the liquid or molten methoxymethyl compound and between 5 and 50 times as much nitric acid into a heated pressure vessel in which a pressure of between 5 and 30 atmospheres is maintained by suitably releasing nitric oxides through a control valve adjusted to the desired pressure. Preferably, the nitric acid and the methoxymethyl compound are continuously introduced into the pressure vessel through separate conduits. Corresponding quantities of the oxidized solution may be continuously withdrawn from the reaction vessel. By properly controlling the introduction of materials into the pressure vessel, maintenance of a constant nitric acid concentration and temperature, it is possible to obtain moderate oxidation conditions, and in many cases the oxidation will be completed in between about 20 and 30 minutes.

It is also possible to carry out the oxidation at ambient pressure and at temperatures of between about 20° C. and the boiling point of the nitric acid. By proceeding in this manner, the methoxymethyl groups will be relatively selectively converted into carboxyl groups so that alkylbenzene carboxylic acids will be formed. Subsequent oxidation of the retained alkyl groups may be carried out under the conditions of the one step pressure oxidation described above. However, by thus oxidizing in two steps, about one hour is required for each of the two oxidation steps. Marked diminishing of the development of nitrous oxides indicates completion of the reaction.

The following examples are given as illustrative only of the present invention, without limiting the invention to the specific details of the examples.

Example I

A suspension of 40 parts by weight of technical calcium oxide in 320 parts by weight of 96–98% methanol is heated to 120° C. in a stainless steel autoclave provided with a stirring device. 140.5 parts by weight of crude o/p-chloro-methyl-toluene are pumped into the autoclave under stirring over a period of 30 minutes. Thereafter, the reaction is permitted to proceed for about 20 minutes and, after cooling, the reaction mixture is filtered in order to separate the precipitated calcium chloride therefrom. By distillation of the filtrate, 115 parts by weight of a mixture of ortho and para methoxymethyl toluene are obtained. The mixture contains about 56% by weight of para methoxymethyl toluene and has a boiling point of 78° C. at 12 mm. Hg. 8 parts by weight of bismethoxymethyl-toluene having a boiling point of 125° C. at 12 mm. Hg can be recovered from the distillation residue.

The thus obtained 115 parts by weight of o/p-methoxymethyl-toluene, together with 3500 parts by weight of nitric acid having a density of 1.10 are pumped during a period of 30 minutes through a reaction tube heated to 170° C. The pressure in the reaction tube is maintained at 19 atmospheres absolute by letting off nitric oxides. 75 parts by weight of terephthalic acid having an acid number of 670 are precipitated from the thus treated solution, and from the evaporated nitric acid mother liquor 60 parts by weight of o-phthalic acid having an acid number of 668 are obtained. By similarly oxidizing the bismethoxy-methyl-toluene, pure trimellitic acid is obtained in a yield better than 90% of the theoretical yield.

The conversion of the chloromethyl toluene into terephthalic acid is indicated by the following equation:

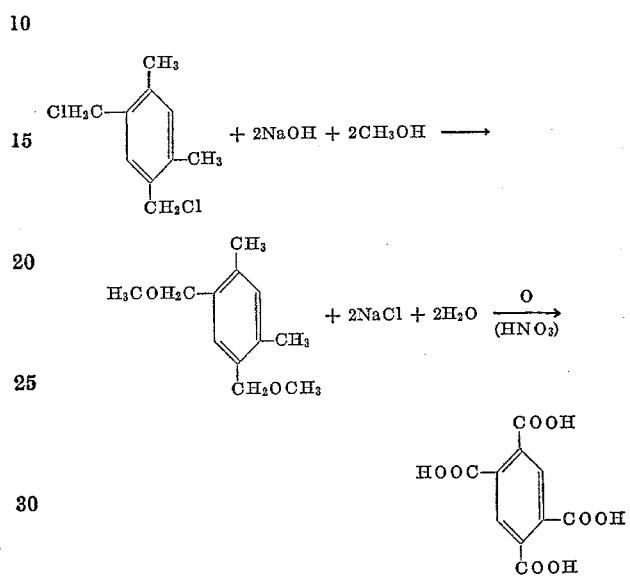

Example II 203 parts by weight of technical 4,6-bischloro-methyl-(m)-xylene having a melting point of about 93° C. and containing small quantities of 2,4-bischloromethyl-1,3-dimethyl-benzene are quickly introduced into a warm mixture of 90 parts by weight of sodium hydroxide and 600 parts by weight of methanol. Upon subsequent distillation, 190 parts by weight of an isomeric mixture of bismethoxymethyl-(m)-xylene having a boiling point of 132° C. at 11 mm. Hg are obtained.

200 parts by weight of the thus-obtained bis-ether and 7000 parts by weight of nitric acid having a density of 1.15 are passed per hour through an upright stainless steel pressure tube heated to 195° C., at such rate that the mixture will be in the pressure tube for between 20 and 30 minutes. A pressure of about 26 atmospheres absolute is maintained in the pressure tube. Upon cooling of the clear solution which is released from the pressure tube through a pressure trap, crystals of pyromellitic acid are formed. In this continuous process 214 parts by weight of pyromellitic acid per hour are obtained. The pyromellitic acid has an acid number of 881 (theoretical acid number 884) and upon concentrating the mother liquor another 32 parts by weight of a mixture of tetracarboxylic acids having an acid number of 875 is recovered. This mixture consists of about equal parts of pyromellitic acid and mellophanic acid which may be separated from each other by recrystallization of an aqueous solution. The total yield based on the originally introduced chloromethyl compound amounts to 92%.

The conversion of the 4,6-bischloromethyl-(m)-xylene into pyromellitic acid is indicated by the following equation:

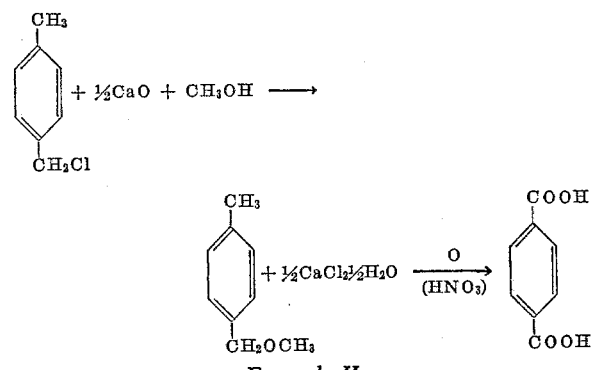

Example III 190 parts by weight of an isomeric mixture of bismethoxymethyl-(m)-xylene which were produced as described in Example II are slowly dropwise introduced into a round flask equipped with stirrer and reflux condenser. Prior thereto 2000 parts by weight of concentrated nitric acid having a density of 1.4 had been placed into the round flask. The flask is cooled so as to maintain a reaction temperature of 20° C. The bis-ether is dissolved under formation of nitric oxides. After introduction of the bis-ether has been completed, the reaction is continued for one hour at 50° C. and for a further hour at 80° C. During this time, dimethyl-isophthalic acid precipitates as a very fine powder in a yield equal to 90% of the theoretical yield.

The thus formed suspension is then diluted with 1500 parts by weight of water and oxidized by heating for one hour in a titanium autoclave at a temperature of 170° C. and a pressure of 21 atmospheres absolute. The yield of pyromellitic acid and mellophanic acid equals 233 parts by weight or 94% of the theoretical yield.

Example IV

In the manner described in Example II, 203 parts by weight of 2,5-bischloromethyl-(p)-xylene are reacted with methanol and sodium hydroxide. The theoretical yield of 194 parts by weight of bismethoxymethyl-(p)-xylene having a melting point of between 71 and 72° C. is obtained. The molten bis-ether is oxidized with nitric acid in the manner described in Example II. 241 parts by weight of pyromellitic acid having an acid number of 881 are obtained, corresponding to 95% of the theoretical yield.

If instead 100 parts by weight of bismethoxymethyl-(p)-xylene are heated with 1800 parts by weight of 20% nitric acid for two hours under stirring at a temperature of between 90 and 100° C., the crude dimethylterephthalic acid is obtained in a yield equal to 92% of the theoretical yield.

Example V

In a manner described in Example II, 300 parts by weight of crude bischloromethyl-pseudocumene are reacted with methanol and sodium hydroxide to form the methoxymethyl compound. Upon distillation, apart from a small proportion of pseudocumene, 42 parts by weight of methoxymethyl-pseudocumene having a boiling point of 92° C. at 11 mm. Hg, 218 parts by weight of bismethoxymethyl-pseudocumene having a boiling point of 139° C. at 11 mm. Hg and 15 parts by weight of distillation residue are obtained.

218 parts by weight of bismethoxymethyl-pseudocumene are pumped within a period of one hour into a stainless steel autoclave containing 7500 parts by weight of nitric acid of a density of 1.10 which had been heated to 200° C. A pressure of 29 atmospheres absolute is maintained. Thereafter, the solution is evaporated and the benzene pentacarboxylic acid is isolated. A yield of 284 parts by weight having an acid number of 940 is obtained.

By oxidizing the methoxymethyl-pseudocumene under similar conditions, 56 parts by weight of pyromellitic acid are obtained.

Example VI 226 parts by weight of bischloromethyl-durene are introduced over a period of 30 minutes into a suspension of 90 parts by weight of sodium hydroxide in 640 parts by weight 98–99% methanol located in an iron vessel equipped with stirrer and reflux condenser. The suspension had been preheated to 70°. Upon subsequent cooling and partial evaporation of the solution, 211 parts by weight of bismethoxymethyl-durene are precipitated in a mixture with sodium chloride. The bis-ether is purified by boiling with water.

211 parts by weight of bismethoxymethyl-durene having a melting point of between 112 and 113° C. are heated to boiling for one hour together with 1400 parts by weight of nitric acid having a density of 1.16. The reaction is carried out in an enameled reaction vessel equipped with stirrer and reflux condenser. A reaction product is formed which is highly viscous when warm and solidifies upon cooling. It has an acid number of about 300. The reaction product together with the nitric acid mother liquor is placed in a titanium autoclave equipped with a stirring device. The oxidation is completed under addition of a further 2400 parts by weight of nitric acid having a density of 1.20, at a temperature of 170° C. and a pressure 21 atmospheres absolute. Completion of the oxidation requires between one and one and one-half hours.

Upon evaporation of the oxidized solution, 301 parts by weight of mellitic acid having an acid number of 980 (theoretical acid number 984) are obtained.

Example VII

The reaction is carried out in a vertical titanium pressure tube which is heated to 170° C. The reactants are introduced into the pressure tube from below through two separate conduits over a period of one hour. Through one of the conduits which is equipped with a heatable pump, 500 parts by weight of molten trismethoxymethyl-mesitylene are introduced. The trismethoxymethyl-mesitylene has a melting point of between 109° and 110° C. and is produced by reaction of trischloromethyl-mesitylene with methanol and sodium hydroxide. 15,000 parts by weight of hot nitric acid having a density of 1.12 are introduced through the other conduit. By repeated letting off of nitric oxides, the pressure in the reaction tube is maintained at 23 atmospheres absolute. After the reaction mixture has been maintained in the pressure tube for about one hour, the clear oxidized solution is withdrawn at the upper end of the tube through a pressure tray at the same ratio at which, upon continuous operation, the introduction of nitric acid is continued. The withdrawn solution is evaporated and it is found that from 500 parts by weight of trismethoxymethyl-mesitylene 585 parts by weight of mellitic acid having an acid number of 978 are obtained, corresponding to 86% of the theoretical yield.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing benzene carboxylic acids by oxidation of methoxymethyl-alkyl-benzene ethers produced by reacting a mononuclear aromatic compound having linked to its nucleus at least one lower alkyl group and at least one chloromethyl group with methanol in the presence of a substance selected from the group consisting of the hydroxides of alkali and alkaline earth metals and the oxides of alkaline earth metals, comprising the step of reacting said ether at a gauge pressure of 5–30 atmospheres and at a temperature between about 140–220° C. with nitric acid in an amount and of a concentration such as to oxidize said ether to the corresponding polycarboxylic acid.

2. A method as defined in claim 1, wherein said amount of nitric acid is equal to between about 5 and 50 times the weight of said ether and the concentration of said nitric acid is between about 10 and 66%.

3. A method as defined in claim 2, wherein said mononuclear aromatic compound is selected from the group consisting of ortho, meta and para chloromethyl-toluene, dichloromethyl - toluene, monochloromethyl - xylene, dichloromethyl-xylene, monochloromethyl - pseudocumene, dichloromethyl-pseudocumene, monochloromethyl-mesitylene, dichloromethyl-mesitylene, trichloromethyl-mesitylene, monochloromethyl-durene and dichloromethyl-durene.

4. A method of producing benzene carboxylic acids by oxidation of methoxymethyl-alkyl-benzene ethers produced by reacting a mononuclear aromatic compound having linked to its nucleus at least one lower alkyl group and at least one chloromethyl group with methanol in the presence of a substance selected from the group consisting of the hydroxides of alkali and alkaline earth metals and the oxides of alkaline earth metals, comprising the steps of reacting said ether at a temperature between about 20° C. and the boiling point of the reaction mixture with nitric acid in an amount and of a concentration such as to form of said ether the corresponding alkyl benzene carboxylic acid; and reacting the thus formed alkyl benzene carboxylic acid at a gauge pressure of between 5 and 30 atmospheres and at a temperature between about 140 and 220° C. with nitric acid in an amount and of a concentration such as to oxidize said alkyl benzene carboxylic acid to the corresponding carboxylic acid.

5. A method as defined in claim 4, wherein said amount of nitric acid is equal to between about 5 and 30 times the weight of said ether and the concentration of said nitric acid is between about 10 and 66%.

6. A method as defined in claim 5, wherein said mononuclear aromatic compound is selected from the group consisting of ortho, meta and para chloromethyl-toluene, dichloromethyl-toluenes, monochloromethyl-xylene, dichloromethyl-xylene, monochloromethyl - pseudocumene, dichloromethyl-pseudocumene, monochloromethyl-mesitylene, dichloromethyl-mesitylene, trichloromethyl-mesitylene, monochloromethyl-durene, and dichloromethyl-durene.

(References on following page)

References Cited

UNITED STATES PATENTS

| | | | |
|---|---|---|---|
| 2,853,514 | 9/1958 | Brill | 260—524 |
| 2,966,514 | 12/1960 | Benning et al. | 260—524 |
| 3,068,280 | 12/1962 | Katzschmann | 260—523 |

FOREIGN PATENTS 730,474  5/1955  Great Britain.

LORRAINE A. WEINBERGER, *Primary Examiner.*
RICHARD K. JACKSON, *Examiner.*
S. B. WILLIAMS, *Assistant Examiner.*